Figure 1:
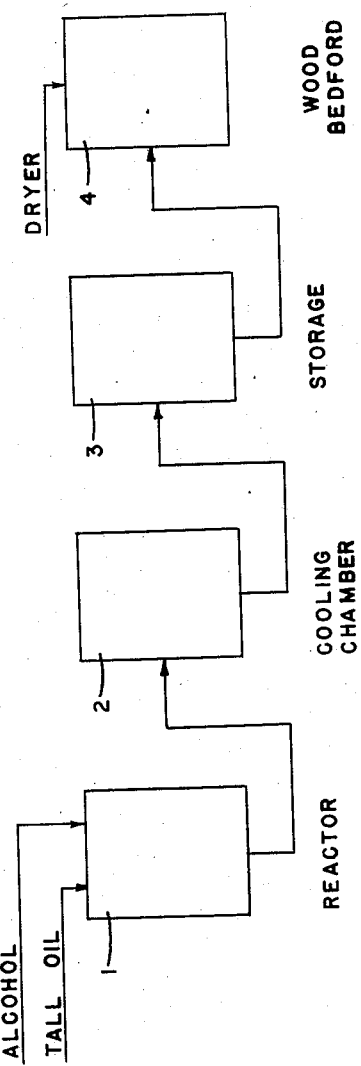

July 14, 1959  M. C. NELSON ET AL  2,894,560
SURFACE COVERING PRODUCT AND PROCESS THEREFOR
Filed April 15, 1955

INVENTOR.
MELVIN C. NELSON
PAUL S. HESS
BY
Joseph C. Hackins Jr.

United States Patent Office 2,894,560
Patented July 14, 1959

2,894,560

SURFACE COVERING PRODUCT AND PROCESS THEREFOR

Melvin C. Nelson, Nutley, and Paul S. Hess, West Orange, N.J., assignors to Congoleum-Nairn Inc., Kearny, N.J., a corporation of New York Application April 15, 1955, Serial No. 501,662

10 Claims. (Cl. 154—25)

This invention relates to new compositions and processes suitable for the preparation of surface covering products of the linoleum type.

Linoleum is conventionally prepared from a mixture of oxidized and polymerized drying or semidrying oil, resin, filler, and pigment. The oil and the resin function as a binder or cement for the filler and pigment and generally comprise from about 20% to about 50% of a composition. The remainder consists essentially of filler such as ground cork, calcium carbonate, wood flour, talc, and the like and small amounts of pigment.

In order to continuously form linoleum composition into sheets in a practical manner, the composition must be pliable or plastic enough to permit calendering, pressing, polishing, and the like, but strong enough to hold together during these operations. For this reason it is the usual practice to flux an oil which is only partially oxidized and polymerized with the resin and then mix in the filler and pigment prior to sheeting. The partial oxidation and polymerization is most frequently accomplished by heating and agitating the oil in the presence of a metal drier while passing a large amount of air thereover until the first formation of a unitary plastic mass. After sheeting the composition, further oxidation and polymerization of the oil or "curing" is required to achieve the wearing characteristics typical of linoleum. Curing is effected by subjecting sheets of the uncured composition to elevated temperatures on the order of from about 120° F. to about 220° F. for from about a week to about a month.

Although linseed oil has been employed as the principal drying oil from the earliest times in the linoleum industry and provides the product now known and accepted, it has certain disadvantages. The supply fluctuates greatly and therefore the cost of producing linoleum is not stable. During times of national emergency, linseed oil is difficult to obtain from abroad and the indigenous supply is required in defense production. Moreover, the linseed oil which is regularly available varies considerably in its physical and chemical properties and therefore frequent processing and formulation changes are required in order to provide a final product having uniform characteristics.

The linoleum industry has long been seeking a partial or complete replacement for linseed oil and has met with some degree of success in connection with soya bean oil, chinawood oil, tall oil, fish oil, and the like. Tall oil has appeared particularly attractive because of its cost and availability; however, it cannot be used in large amounts without giving rise to serious deficiencies in a floor or wall covering prepared from it.

Tall oil, which is obtained as a by-product in the manufacture of sulfate pulp from pine wood, fir wood, spruce wood, and the like, is not a true oil in that it contains only resin acids such as abietic acid or rosin acid, drying oil fatty acids such as linolenic acid, linoleic acid and oleic acid and unsaponifiables such as sterols and higher alcohols. For this reason attempts have been made to esterify it to provide a material more closely resembling a true oil. The Office for Military Government for Germany in Fiat Final Report No. 1144 dated June 5, 1947, entitled "Utilization of Tall Oil in Germany" by John F. Rooney, at page 10 reports that the German linoleum industry has attempted to use tall oil and tall oil esters of polyhydric alcohols as partial replacements for linseed oil. However, neither tall oil nor esterified tall oil have the characteristics which are necessary for providing satisfactory linoleum when used in relatively large amounts. In addition, esterified tall oil is extremely difficult to handle in processing.

It is an object of the present invention to utilize tall oil in a linoleum composition as a partial or complete replacement for the conventional drying oils and resins now used. It is also an object to accomplish the foregoing without requiring special modification of the formulation in which it is used, particularly in those cases where partial replacement is contemplated. Another object is to provide a linoleum product at a decreased cost which has all of the desirable characteristics of the present product. Another object is to provide linoleum which does not discolor during stoving or with time to the same extent as occurs in linoleum prepared with conventional binders. This object is of particular importance when light-colored products are desired. It is a further object to provide a process for preparing linoleum which is economical and simple in operation and which permits the use of conventional linoleum processing equipment, the replacement of which would otherwise involve huge expenditures of capital.

It has now been dscovered that tall oil can be modified for use as a linoleum binder or cement, thereby permitting achievement of the above and other important objects, by maintaining most of the resin acids in the tall oil unreacted while esterifying the fatty acid content thereof with a polyhydric alcohol containing from three to six hydroxyl groups.

Although crude tall oil contains from about 30% to about 45% of resin acids, consisting almost entirely of abietic or rosin acids, the tall oil to be esterified in accordance with the invention must contain at least about 15% and no more than about 35% resin acids and preferably between about 25% and about 30%. Esterification can be effected outside the above limits; however, linoleum binders prepared from such esters are highly unsatisfactory in regard to difficulty of preparation, reformulation required in use, and/or final product characteristics. No proper degree of esterification has been found which permits the use of a tall oil containing less than 15% resin acids without greatly increasing handling problems with respect to the uncured linoleum composition. For example, a partial tall oil ester prepared from tall oil containing less than 15% resin acids has greatly reduced binding ability and cannot hold decoration. When the original oil contains from about 25% to about 30% resin acids, the ester prepared therefrom has the greatest binding ability and workability. Even more importantly, however, a partial tall oil ester prepared from tall oil containing less than 15% resin acids cannot be used as a replacement for conventional binder without reformulating the remainder of the binder ingredient. The necessity of such reformulation detracts from one principal advantage of the invention, namely, that the product thereof may be used in whole or in part in or as a linoleum binder without upsetting usual compounding and formulation practice. In addition, it is highly impractical to refine tall oil any more than is necessary in that increased costs result therefrom.

Likewise, no proper degree of esterification has been found which permits use of a tall oil containing more than about 35% resin acids without greatly increasing the stiffness of a finished linoleum prepared from it. Within the ranges set forth excellent stiffness properties are obtained and especially within the narrower preferred range.

Tall oil of the required resin acid content is obtained simply by fractionally distilling excess resin acids from crude tall oil under vacuum at high temperatures and/or by fractionally crystallizing a part of the resin acids. Blends of tall oils having different resin acid contents are also satisfactory.

In the practice of the invention, it is intended that the fatty acid content of the tall oil be substantially completely esterified preferentially to the resin acids. This is preferably conducted as described more fully hereinafter in the presence of a stoichiometric amount of polyhydric alcohol based on the fatty acid content. The final resin acid content must be within the range of from about 10% to about 30% and preferably 20% to 25%. Outside of the above limits those same disadvantages attending the original use of a tall oil having a resin acid content outside of the range of from about 15% to about 35% become apparent. The undesirable stiffness arising from the use of a tall oil having too great a resin acid content becomes most evident, of course, when large amounts of it are used in a composition.

Both of the aforementioned limitations on the resin acid content of the tall oil, that is, before and after esterification, are critical to the successful use of esterified tall oil as a binder in linoleum production. From these limitations, it is apparent that a small amount of esterification of the resin acid is not harmful and perhaps is desirable. It is presumed that when stoichiometric amounts of alcohol are used in the esterification, any esterification of the resin acids correspondingly results in the presence of an equal amount of unreacted fatty acids in the final product.

The esterification is most advantageously conducted in a stainless steel reaction vessel in a nitrogen atmosphere. Charring of the alcohol may be prevented by agitation during the reaction. An initial temperature of about 360° F. may conveniently be employed and thereafter the reactants may be permitted to reach from about 400° F. to about 500° F. From the point of view of control and time of reaction, a reaction temperature of from about 425° F. to about 475° F. is preferred. Under optimum conditions four to six hours at this temperature are required to complete the reaction. The end point is determined most easily by calculating the acid number of the ester.

The alcohols to be used in the esterification must contain at least three and no more than about six hydroxyl groups. Glycerol, pantaerythritol, inositol, dimethylglucoside, sorbitol, mannitol, ethyltrimethylol methane, methyltrimethylol methane, and the like may be used. Those alcohols containing four hydroxyl groups are preferred. Of these, pentaerythritol (as well as its dimer and trimer) is the simplest to work with and provides the best final product. Glycerol esters generally result in linoleum compositions which are somewhat softer than those prepared from pentaerythritol, while sorbitol and inositol esters provide stiffer products. Dimethyl glucoside esters provide excellent final products but are more difficult to handle in processing. Blends of alcohols containing more than four and less than four hydroxyl groups may also be used. This is not generally economical, however, because the cost of blending is not merited in terms of any product quality which is in addition to that obtained with the preferred pentaerythritol. The texture or the consistency of a linoleum composition prepared in accordance with the invention is also effected to some extent by the length of the carbon chain of the alcohol employed in the esterification. If a straight chain alcohol is used, it should not contain more than about six carbon atoms in order that the texture or consistency and the resiliency typical of linoleum be maintained. On the other hand, the effect of the number of carbon atoms in cyclic alcohols is not readily apparent. Generally, it is desirable that no more than six carbon atoms be present; however, for some purposes and with some cyclic alcohols, satisfactory results may be obtained with more complex molecules. Any alcohol which breaks down into reactive units as described above in the course of the esterification is meant to be included within the scope of the invention. It is believed that as the size of the alcohol molecule grows, the tendency of a tall oil ester prepared therefrom to oxidize and polymerize in a manner suitable for its use as a binder in a linoleum composition will decrease.

In most respects, the partial tall oil esters of the invention may be used in accordance with ordinary practice in the linoleum industry as a partial or complete replacement for conventional binder ingredients; however, more time is generally required to partially oxidize and polymerize the partial ester than is required to effect the same properties in conventional oleoresinous binders. In many cases, 30 to 40 hours are necessary to achieve a binder which is satisfactory for subsequent mixing and processing. It has been discovered that where it is desired to decrease the time required for the partial oxidation and polymerization of the partial ester, metal driers may be used as with conventional oleoresinous binders providing decreased amounts of them are employed.

In the preparation of conventional linoleum binders such as linseed oil and resin up to about 2% of lead in the form of naphthenates, tallates, and the like or litharge may be used to decrease the time required for oxidation during the partial oxidation and polymerization of the oil prior to subsequent fluxing, mixing, and sheeting. Very small amounts of manganese and/or cobalt are also added for special purposes. If, in the practice of the present invention, the amount of lead drier exceeds about 75% of the amount that would be normally employed, a final product having greatly increased and unacceptable stiffness results. It is preferred that the amount of lead drier never exceed 1% based on the weight of the partial ester, and even at this level, the final product prepared therefrom should be used for cutting into tiles which ordinarily are stiffer than "yard goods." ½% of lead drier provides an excellent product and reduces the time required for partial oxidation and polymerization from 30 to 40 hours to less than 20 hours.

The above findings were unexpected in view of the experience in the surface coating industry where the complete esters of tall oil have been used and where it is believed that amounts of drier greater than normal are required. (For example, note J. Oil and Colour Chemical Association No. 358, vol XXXIII April 1950, p. 175, 177.)

Figure 1 of the drawings is a schematic diagram of a preferred manner of preparing the binder of the invention.

Figure 2:
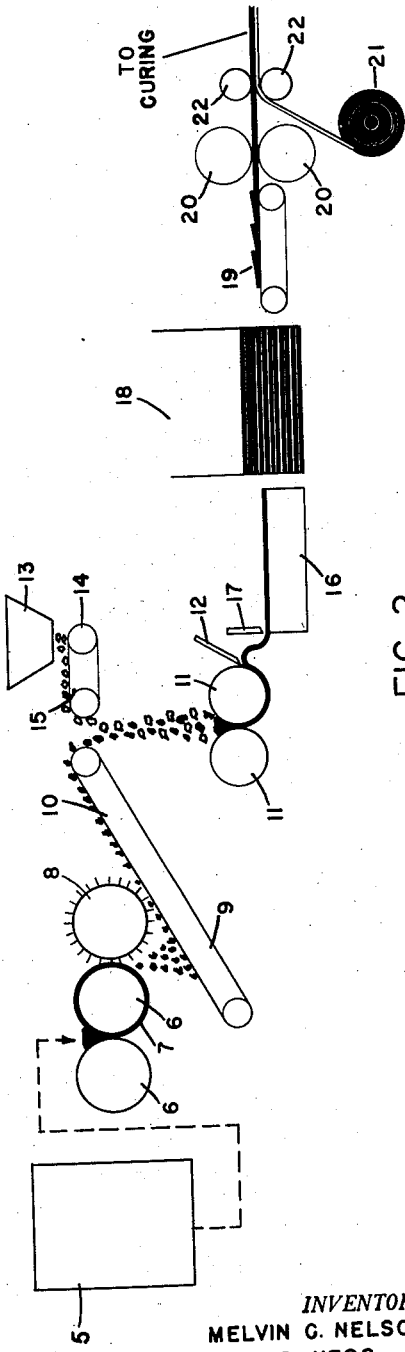

Figure 2 is a schematic drawing of a typical process for preparing marbleized linoleum.

Tall oil and alcohol of the desired properties and proportions set forth hereinbefore are simply added to the reactor 1 and heated for a suitable length of time. The end point of the esterification may be determined by recording the acid number of the reactants. Although the partial ester may be cooled in the reaction vessel, it is generally better to cool it in a separate chamber as at 2 in order to maintain the temperature in the reaction vessel for a subsequent batch. The partial ester may be stored at 3 until needed. Storage at room temperature is satisfactory. A Wood Bedford is shown in the drawings at 4 for the purpose of partially oxidizing and polymerizing the partial ester to the proper degree for use as a linoleum binder. The Wood Bedford, in general, is a horizontal cylinder containing means for vigorous agitation and for blowing air over the surface of the material undergoing treatment. Its use is conventional in the linoleum industry. The proper degree of partial oxidation and polymerization is determined empirically and is generally coincident with the formation of a unitary plastic mass in the machine. Conventional linoleum equipment may be used in processing the binder of the invention with fillers and pigments to form sheets. For example, a Banbury mixer at 5 may be employed for mixing the filler and pigments with a binder comprising 100% or less of the partial ester cement described herein. After these ingredients are mixed, they may be fed manually or mechanically to a sheeter and scratcher shown at 6 and 8 respectively. The composition 7 builds up on the colder roll of the two roll sheeter 6 and is gouged therefrom into small particles 10 by the action of the pins on the rotating scratcher 8. Other methods of providing decorative particles are well known in the art. A conveyor belt 9 may be used to transport a steady flow of particles to the two roll calender at 11. Hopper 13 delivers composition particles 15 of contrasting color to conveyor 14. Particles 15 are prepared in the same manner as those being delivered from the sheeter and scratcher 6 and 8. The conveyor 14 delivers particles 15 to calender 11 which forms a jaspe sheet of the blend of particles 10 and 15. The jaspe sheet is stripped from calender 11 by a doctor blade at 12 and moves along table 16 where it is cut at suitable intervals by guillotine 17. These smaller sheets are then turned 90° and stacked at 18. Thereafter they are fed in partially over-lapping relationship on a conveyor as at 19 so as to enter calender 20 in a direction transverse to the direction of the jaspe streaks. The marbleized sheet formed in this manner is fed to a rotary press at 22 along with a bitumen impregnated felt backing material 21. The linoleum thus prepared is directed to stoving.

The following detailed examples set forth various linoleums formulated in accordance with the invention. The physical characteristics of the final products were tested by the well-known test methods of the art and compared with a control. Stiffness was tested on the Suvant apparatus. Conventional linoleum of standard gauge has a Suvant of from about 400 to about 1000 when it is backed with asphalt impregnated felt, products measuring over or under these figures being respectively too stiff or too flexible for most uses. Abrasion was tested on the Taber apparatus. Conventional linoleum loses from about 10 to about 15 mils of wear layer after 5000 revolutions on this instrument. All Taber readings reported hereinafter were taken after 5000 revolutions. The amount of white pigment required to obtain a given coloration has been found to be considerably less when using the binder of the invention. This is due in part to the decreased amount of yellowing which occurs in the binder during stoving. Color intensity comparisons are best made visually, and in the following examples the control was used as the standard of comparison. The quality of decoration which is highly important to the consumer is also an indication of the handleability of a composition during processing. If, for example, in a marbleized pattern the decoration is sharp with little smearing or blending of color areas, the composition from which it was prepared may be easily handled. On the other hand, an indefinite, smeared pattern indicates a composition which is difficult to handle. In the following examples, the decoration of the control, observed visually, was excellent and each of the products of the invention was compared thereto.

Initial indentation was measured by placing a 260 pound static load on a sample measuring 0.282 inch in diameter for one minute. The thickness of the sample was 0.050 inch in each case and the load was transmitted through a cylindrical pin also measuring 0.282 inch in diameter. The indentation is reported as a percentage of the thickness of the material. Residual indentation is determined one minute after release of the load on the sample. A good grade of standard linoleum has an initial indentation of from about 28% to about 60% and a residual indentation of from about 10% to about 40%. Alkali resistance is another important characteristic of linoleum. It was measured in the following examples by surrounding a sample of the material with a dam and then flooding the sample with a 5% solution of caustic soda. After one hour the sample was removed and cleaned and the amount of depression therein due to the action of the alkali was reported. Good quality linoleum generally has an alkali resistance measured by this test of below about 0.020 inch.

*Example I*

In this and the following examples, a control was prepared by thoroughly mixing 37.9% of binder with 52.5% filler and 9.6% pigment. The filler consisted of 51% wood flour and 49% calcium carbonate. The binder consisted of 84% linseed oil and 15% rosin. 1% of a lead drier was blended with the oil which was then oxidized and polymerized in a Wood Bedford at 180° F. After the partially oxidized and polymerized binder was thoroughly mixed with the rosin, filler, and pigment in a mixer of the Banbury type, the composition was sheeted. Two batches as described above but of contrasting color were prepared and a marbleized decoration was prepared in the conventional manner employing the well-known cross calendering technique. Sheets of the marbleized linoleum were stoved for 26 days at a temperature of 170° F. Testing of the control indicated:

| | |
|---|---|
| Stiffness | 650 Suvant units. |
| Percent initial indentation | 41 percent. |
| Percent residual indentation | 19 percent. |
| Abrasion | 0.012 inch. |
| Alkali resistance | 0.015 inch. |

Refined tall oil having a rosin acid content of 28.5% was used in preparing a binder as described in the invention. 100 parts of it were mixed with 8.8 parts of pentaerythritol which is approximately the calculated amount required to react with substantially only the fatty acids which were present in the tall oil. The oil was heated in a stainless steel kettle in a nitrogen atmosphere until it had a temperature of 160° F. before the alcohol was added. The temperature was raised to 460° F. and held there for 4 hours, after which the material had an acid number of 58.6. It was then cooled to below 150° F. The mixture was vigorously agitated during the esterification and after completion it had a free rosin acid content of 25%, about 3.5% of the rosin acids apparently being esterified along with the fatty acids.

One-half part of a lead drier was then blended with 100 parts of the partial ester and the blend was partially oxidized and polymerized in a conventional Wood Bedford machine. About 17½ hours were required for the material to reach a consistency suitable for use as a linoleum binder. The end point of this reaction was determined empirically as with conventional binders.

To provide decoration and physical characteristics equal or superior to the control, 34% of binder consisting essentially only of the partial ester described was well mixed with 59.6% of the filler used in the control and 6.4% pigment. Two batches of the same contrasting colors used in the control were prepared and they were used in the same proportion to provide a marbleized sheet. The sheet was stoved for 26 days at 170° F. Testing indicated:

| | |
|---|---|
| Stiffness | 600 Suvant units. |
| Percent initial indentation | 41 percent. |
| Percent residual indentation | 18 percent. |
| Abrasion | 0.012 inch. |
| Alkali resistance | 0.014 inch. |
| Decoration | Excellent. |
| Coloration | Same as control. |

*Example II*

36% of a binder comprising 50% of the partially oxidized and polymerized partial ester of the invention and 50% of the partially oxidized and polymerized binder used in the control were well mixed in a Banbury mixer with 56.8% of the fillers used in the control and 7.2% pigments. Sheets having the same decoration as the control were prepared and stoved for 26 days at 170° F. On testing, the product indicated:

| | |
|---|---|
| Stiffness | 625 Suvant units. |
| Percent initial indentation | 39 percent. |
| Percent residual indentation | 19 percent. |
| Abrasion | 0.012 inch. |
| Alkali resistance | 0.012 inch. |
| Decoration | Excellent. |
| Coloration | Same as control. |

*Example III*

100 parts of tall oil having a rosin acid content of 31% were mixed with 7.2 parts of glycerol and heated to a temperature of 430° F. After 6 hours the acid number of the mixture was 60 and the free rosin acid content was 26%. It was cooled to below 150° F. and then blended with ½% of a lead drier and partially oxidized and polymerized in a Wood Bedford machine for 20.5 hours. 10.2 parts of this binder were well mixed with 23.8 parts of the binder used in the control and with 58 parts of the filler used in the control, and 8 parts of pigment. Two batches of contrasting color were prepared and the composition was sheeted in order to provide the decoration of the control. The sheets were stoved for 24 days at 170° F. On testing, the product indicated:

| | |
|---|---|
| Stiffness | 650 Suvant units. |
| Percent initial indentation | 42 percent. |
| Percent residual indentation | 21 percent. |
| Abrasion | 0.013 inch. |
| Alkali resistance | 0.016 inch. |
| Decoration | Excellent. |
| Coloration | Same as control. |

*Example IV*

100 parts of tall oil having a rosin acid content of 30% were mixed with 10.8 parts of sorbitol and heated to a temperature of 460° F. After 6 hours the acid number of the mixture was 54.6 and the free rosin acid content was 25%. It was cooled to below 150° F. and then blended with ½% of a liquid lead drier and partially oxidized and polymerized in a Wood Bedford machine for 23 hours. 34 parts of this binder were well mixed with 59.6 parts of the filler used in the control, and with 6.4 parts of pigment. Two batches of contrasting color were prepared and the composition was sheeted in order to provide the decoration of the control. The sheets were stoved for 26 days at 170° F. On testing, the product indicated:

| | |
|---|---|
| Stiffness | 750 Suvant units. |
| Percent initial indentation | 39 percent. |
| Percent residual indentation | 20 percent. |
| Abrasion | 0.012 inch. |
| Alkali resistance | 0.011 inch. |
| Decoration | Excellent. |
| Coloration | Same as control. |

*Example V*

100 parts of refined tall oil having a rosin acid content of 29% were mixed with 12.0 parts of dimethylglucoside and heated to a temperature of 470° F. When the acid number of the mixture was 55, the free rosin acid content was 25%. It was cooled to below 150° F. and then blended with ½% of a lead drier and partially oxidized and polymerized in a Wood Bedford machine for 18 hours. 16 parts of this binder were well mixed with 19 parts of the binder used in the control, with 52.5 parts of the filler used in the control, and with 8.5 parts of pigment. Two batches of contrasting color were prepared and the composition was sheeted in order to provide the decoration of the control. The sheets were stoved for 26 days at 170° F. On testing, the product indicated:

| | |
|---|---|
| Stiffness | 650 Suvant units. |
| Percent initial indentation | 40 percent. |
| Percent residual indentation | 19 percent. |
| Abrasion | 0.012 inch. |
| Alkali resistance | 0.015 inch. |
| Decoration | Excellent. |
| Coloration | Same as control. |

*Example VI*

100 parts of refined tall oil having a rosin acid content of 30% were mixed with 8.4 parts of inositol and heated to a temperature of 460° F. After 6 hours the acid number of the mixture was 60 and the free rosin acid content was 26%. It was cooled to below 150° F. and then blended with ½% of a lead drier and oxidized and polymerized in a Wood Bedford machine for 19 hours. Two batches of contrasting color were prepared and the composition was sheeted in order to provide the decoration of the control. The sheets were stoved for 28 days at 170° F. On testing, the product indicated:

| | |
|---|---|
| Stiffness | 700 Suvant units. |
| Percent initial indentation | 41 percent. |
| Percent residual indentation | 19 percent. |
| Abrasion | 0.012 inch. |
| Alkali resistance | 0.013 inch. |
| Decoration | Excellent. |
| Coloration | Same as control. |

*Example VII*

17 parts of the glycerol ester binder described in Example III were well mixed with 17 parts of the sorbitol ester binder described in Example IV, with 59 parts of the filler, and with 6.4 parts of pigment. Two batches of contrasting color were prepared and a marbleized sheet having the decoration of the control was prepared. It was stoved for 26 days at 170° F. The product, on testing, indicated:

| | |
|---|---|
| Stiffness | 650 Suvant units. |
| Precent indentation | 40 percent. |
| Percent indentation | 18 percent |
| Abrasion | 0.012 inch. |
| Alkali resistance | 0.013 inch. |
| Decoration | excellent. |
| Coloration | same as control. |

In each of the above examples, the product of the invention is as good or better than the control in all important respects within the practical limits of testing.

The need for a decreased amount of pigment to achieve a given coloration is clearly apparent. The examples demonstrate many of the possibilities of blending different esters with each other and with conventional linoleum binders without the need for reformulating them.

which is of great value when producing linoleum during periods of fluctuating raw material prices. The processing of the composition described in the examples was simple and economical and required no extra handling or equipment.

While the invention has been described in connection with specific illustrations and detailed examples, it is not to be limited thereby. Many variations in preparation, formulation, and processing of the partial ester will be apparent to those skilled in the art. Likewise, there are many well-known processing techniques of linoleum production which are applicable to the present invention. Therefore, reference is to be had to the appended claims for a definition of the limits of the invention.

What is claimed is:

1. In a surface covering of the linoleum type which comprises a backing and bonded thereto a layer of cured linoleum composition containing about 20 percent to about 50 percent cured linoleum binder and about 50 percent to about 80 percent filler, the improvement which comprises utilizing as the sole drying oil component of said binder an oxidized and polymerized partial ester of tall oil, said ester having a resin acid content of about 10 percent to about 30 percent, the fatty acid content of said tall oil being substantially completely esterified with a polyhydric alcohol containing from 3 to 6 hydroxyl groups, said tall oil having a resin acid content of about 15 percent to less than 35 percent prior to esterification.

2. In a surface covering of the linoleum type which comprises a backing and bonded thereto a layer of cured linoleum composition containing about 20 percent to about 50 percent cured linoleum binder and about 50 percent to about 80 percent filler, the improvement which comprises utilizing as the sole drying oil component of said binder an oxidized and polymerized partial ester of tall oil, said ester having a resin acid content of 20 percent to 25 percent, the fatty acid content of said tall oil being substantially completely esterified with a polyhydric alcohol containing from 3 to 6 hydroxyl groups, said tall oil having a resin acid content of 25 percent to 30 percent prior to esterification.

3. In a surface covering of the linoleum type which comprises a backing and bonded thereto a layer of cured linoleum composition containing about 20 percent to about 50 percent cured linoleum binder and about 50 percent to about 80 percent filler, the improvement which comprises utilizing as the sole drying oil component of said binder an oxidized and polymerized partial ester of tall oil, said ester having a resin acid content of about 10 percent to about 30 percent, the fatty acid content of said tall oil being substantially completely esterified with a pentaerythritol, said tall oil having a resin acid content of about 15 percent to less than 35 percent prior to esterification.

4. In a surface covering of the linoleum type which comprises a backing and bonded thereto a layer of cured linoleum composition containing about 20 percent to about 50 percent cured linoleum binder and about 50 percent to about 80 percent filler, the improvement which comprises utilizing as the sole drying oil component of said binder an oxidized and polymerized partial ester of tall oil, the fatty acid content of said tall oil being substantially completely esterified with pentaerythritol, said ester having a resin acid content of 20 percent to 25 percent, said tall oil having a resin acid content of 25 percent to 30 percent prior to esterification.

5. In a surface covering of the linoleum type which comprises a backing and bonded thereto a layer of cured linoleum composition containing about 20 percent to about 50 percent cured linoleum binder and about 50 percent to about 80 percent filler, the improvement which comprises utilizing as the sole drying oil component of said binder a partial ester of tall oil, said ester being oxidized and polymerized in the presence of less than 1 percent by weight metal in the form of a metallic dryer and having a resin acid content of about 10 percent to about 30 percent, the fatty acid content of said tall oil being substantially completely esterified with a polyhydric alcohol having 3 to 6 hydroxyl groups, said tall oil having a resin acid content of about 15 percent to less than 35 percent prior to esterification.

6. In a surface covering of the linoleum type which comprises a backing and bonded thereto a layer of cured linoleum composition containing about 20 percent to about 50 percent cured linoleum binder and about 50 percent to about 80 percent filler, the improvement which comprises utilizing as the sole drying oil component of said binder a partial ester of tall oil, said ester being oxidized and polymerized in the presence of less than 1 percent by weight metal in the form of a metallic dryer, and having a resin acid content of about 10 percent to about 30 percent, the fatty acid content of said tall oil being substantially completely esterified with a pentaerythritol, said tall oil having a resin acid content of about 15 percent to less than 35 percent prior to esterification.

7. In a surface covering of the linoleum type which comprises a backing and bonded thereto a layer of cured linoleum composition containing about 20 percent to about 50 percent cured linoleum binder and about 50 percent to about 80 percent filler, the improvement which comprises utilizing as the sole drying oil component of said binder a partial ester of tall oil, said ester being oxidized and polymerized in the presence of less than 1 percent by weight lead in the form of a lead dryer and having a resin acid content of 20 percent to 25 percent, the fatty acid content of said tall oil being substantially completely esterified with a pentaerythritol, said tall oil having a resin acid content of 25 percent to 30 percent prior to esterification.

8. In a method of producing linoleum comprising preparing linoleum composition by blending 20 percent to 50 percent linoleum binder with 50 percent to 80 percent filler, forming said composition into a sheet, bonding said sheet to a backing and curing said backed sheet by exposing it to heat, the improvement which comprises utilizing as the sole drying oil component of said binder an oxidized and polymerized partial ester of tall oil, said ester having a resin acid content of about 10 percent to about 30 percent, the fatty acid content of said tall oil being substantially completely esterified with a polyhydric alcohol containing from 3 to 6 hydroxyl groups, said tall oil having a resin acid content of about 15 percent to less than 35 percent prior to esterification.

9. In a method of producing linoleum comprising preparing linoleum composition by blending 20 percent to 50 percent linoleum binder with 50 percent to 80 percent filler forming said composition into a sheet, bonding said sheet to a backing and curing said backed sheet by exposing it to heat, the improvement which comprises utilizing as the sole drying oil component of said binder an oxidized and polymerized partial ester of tall oil, said ester having a resin acid content of 20 percent to 25 percent, the fatty acid content of said tall oil being substantially completely esterified with a polyhydric alcohol containing from 3 to 6 hydroxyl groups, said tall oil having a resin acid content of 25 percent to 30 percent prior to esterification.

10. In a method of producing linoleum comprising preparing linoleum composition by blending 20 percent to 50 percent linoleum binder with 50 percent to 80 percent filler, forming said composition into a sheet, bonding said sheet to a backing and curing said backed sheet by exposing it to heat, the improvement which comprises utilizing as the sole drying oil component of said binder an oxidized and polymerized partial ester of tall oil, said ester having a resin acid content of about 10 percent to about 30 percent, the fatty acid content of said tall oil being substantially completely esterified with pentaerythritol, said tall oil having a resin acid content of about 15 percent to about 35 percent prior to esterification.

References Cited in the file of this patent

UNITED STATES PATENTS

| | | |
|---|---|---|
| 1,921,566 | Tranzen et al. | Aug. 8, 1933 |
| 2,214,784 | Wayne | Sept. 17, 1940 |
| 2,235,507 | Strauch | Mar. 18, 1941 |
| 2,420,694 | Barthel | May 20, 1947 |
| 2,424,074 | Bent et al. | July 15, 1947 |
| 2,457,847 | Stubblebine | Jan. 4, 1949 |
| 2,503,772 | Rust | Apr. 11, 1950 |
| 2,539,975 | Spitzer et al. | Jan. 30, 1951 |
| 2,752,262 | Dunlap | June 26, 1956 |

FOREIGN PATENTS

| | | |
|---|---|---|
| 480,456 | Canada | Jan. 22, 1952 |